US012624774B1

(12) United States Patent
Wu

(10) Patent No.: US 12,624,774 B1
(45) Date of Patent: May 12, 2026

(54) WATERPROOFING STRUCTURE FOR A WALL PIPE IN AN UNDERGROUND CONSTRUCTION

(71) Applicant: Zhaosheng Wu, Shenzhen City (CN)

(72) Inventor: Zhaosheng Wu, Shenzhen City (CN)

( * ) Notice: Subject to any disclaimer, the term of this patent is extended or adjusted under 35 U.S.C. 154(b) by 0 days.

(21) Appl. No.: 19/068,002

(22) Filed: Mar. 3, 2025

(30) Foreign Application Priority Data

Jan. 3, 2025    (CN) .......................... 202520017150.7

(51) Int. Cl.
   *F16L 5/10*            (2006.01)
(52) U.S. Cl.
   CPC ...................................... *F16L 5/10* (2013.01)
(58) Field of Classification Search
   CPC .................. F16L 5/02; F16L 5/12; F16L 5/10
   See application file for complete search history.

(56) References Cited

U.S. PATENT DOCUMENTS

| | | | | | |
|---|---|---|---|---|---|
| 3,388,931 | A | * | 6/1968 | Johnson | F16L 41/001 |
| | | | | | 285/137.11 |
| 4,293,138 | A | * | 10/1981 | Swantee | F16L 5/10 |
| | | | | | 285/345 |
| 5,921,284 | A | * | 7/1999 | Hauff | F16L 5/02 |
| | | | | | 138/97 |
| 8,895,860 | B2 | * | 11/2014 | Okuhara | H02G 3/22 |
| | | | | | 174/152 G |
| 11,852,273 | B1 | * | 12/2023 | Loew | F16L 5/10 |
| 2004/0170370 | A1 | * | 9/2004 | Leppert | G02B 6/502 |
| | | | | | 385/136 |

| | | | | | |
|---|---|---|---|---|---|
| 2009/0199927 | A1 | * | 8/2009 | Kane | F16L 5/10 |
| | | | | | 141/98 |
| 2013/0000073 | A1 | * | 1/2013 | Canic | F16L 5/10 |
| | | | | | 16/2.2 |
| 2017/0030491 | A1 | * | 2/2017 | Lechuga | F16L 5/10 |
| 2019/0078707 | A1 | * | 3/2019 | Fetchko | F16L 57/02 |
| 2019/0301645 | A1 | * | 10/2019 | West | B64D 37/00 |
| 2019/0316679 | A1 | * | 10/2019 | Warren | F16L 5/027 |
| 2020/0123793 | A1 | * | 4/2020 | Dingler | E04G 17/0752 |
| 2020/0290706 | A1 | * | 9/2020 | Lombardi | F16J 15/028 |
| 2020/0343707 | A1 | * | 10/2020 | Semrau | F16L 5/10 |
| 2022/0333716 | A1 | * | 10/2022 | Eldho | F16L 55/172 |
| 2023/0054946 | A1 | * | 2/2023 | Restle | F16L 5/10 |
| 2023/0304609 | A1 | * | 9/2023 | Vincent | F16L 5/02 |
| 2023/0366488 | A1 | * | 11/2023 | Ospina Medina | F16L 5/08 |
| 2024/0027011 | A1 | * | 1/2024 | Sumida | F16L 5/10 |
| 2024/0153676 | A1 | * | 5/2024 | Kobayashi | F16L 5/10 |

FOREIGN PATENT DOCUMENTS

| | | | | | |
|---|---|---|---|---|---|
| DE | 102015112286 | A1 | * | 2/2017 | ............ H01B 17/58 |
| JP | 10009446 | A | * | 6/1996 | |

* cited by examiner

*Primary Examiner* — Eugene G Byrd
(74) *Attorney, Agent, or Firm* — Li & Cai Intellectual Property Office

(57)                    ABSTRACT

A waterproofing structure for a wall pipe in an underground construction, which includes an extension pipe connected to a casting pipe of the wall pipe and extending out of the wall; a heat shrinkable pipe sleeved on the extension pipe and extending to an inner pipe of the wall pipe, wherein the heat shrinkable pipe is correspondingly and sealedly bonded to the extension pipe and the inner pipe; and an epoxy resin adhesive. A circumferential groove is provided at the wall corresponding to a peripheral edge of the casting pipe, and the epoxy resin adhesive is filled into the circumferential groove. The epoxy resin adhesive is correspondingly and sealedly bonded to the wall and the casting pipe.

10 Claims, 6 Drawing Sheets

WATERPROOFING STRUCTURE FOR A WALL PIPE IN AN UNDERGROUND CONSTRUCTION

CROSS-REFERENCE TO RELATED PATENT APPLICATION

This application claims the benefit of priority to China Patent Application No. 202520017150.7, filed on Jan. 3, 2025, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to the technical field of waterproofing for underground engineering, and specifically to a waterproofing structure for a wall pipe in an underground construction.

BACKGROUND OF THE DISCLOSURE

The wall pipes in underground engineering are critical components for waterproofing. Waterproofing treatment is required both between the casting pipe and the inner pipe of the wall pipe, as well as between the casting pipe and the wall. According to the current national standard GB50108-2008, the method involves welding a water-stopping ring on the outer side of the casting pipe, filling sealing materials and compressing rubber rings between the casting pipe and the inner pipe for waterproofing. During construction, backing materials are first filled between the casting pipe and the inner pipe on the water-facing side, followed by sealing materials. Rubber rings are then compressed between the casting pipe and the inner pipe on the non-water-facing side. Bolts are set on the outer side of the casting pipe, and a short pipe with a flange is sleeved on the outer side of the inner pipe. The flange is connected to the bolts to fix the short pipe to the casting pipe. The short pipe compresses the rubber rings, thereby securing the rubber rings between the casting pipe and the inner pipe. The aforementioned waterproof structure has defects such as a complex structure, construction difficulty, and low waterproofing reliability, such that further improvement is required.

SUMMARY OF THE DISCLOSURE

The objective of the present disclosure is to provide a waterproofing structure for a wall pipe in an underground construction to address the above-mentioned defects in the prior art.

In order to achieve the aforementioned objective, the present disclosure provides a waterproofing structure for a wall pipe in an underground construction, including: an extension pipe connected to a casting pipe of the wall pipe and extending out of a wall; a heat shrinkable pipe sleeved on an outer side of the extension pipe and extending to an outer side of an inner pipe of the wall pipe, wherein the heat shrinkable pipe is correspondingly and sealedly bonded to the extension pipe and the inner pipe; an epoxy resin adhesive; and a circumferential groove provided at the wall corresponding to a peripheral edge of the casting pipe, wherein the epoxy resin adhesive is filled into the circumferential groove, and the epoxy resin adhesive is correspondingly and sealedly bonded to the wall and the casting pipe, respectively.

In some embodiments, the casting pipe has a first end for being connected to the extension pipe, an end surface of the first end is embedded in the wall, and the epoxy resin adhesive is further sealedly bonded to the extension pipe.

In some embodiments, the casting pipe has a socket straight-through part, and the extension pipe is connected to the socket straight-through part.

In some embodiments, the casting pipe further includes a plug used during casting and molding of the wall, the plug has a first annular protrusion extending to an outer periphery of the casting pipe, and the first annular protrusion is configured to reserve the circumferential groove during the casting and molding of the wall.

In some embodiments, the plug is provided with a relief hole, and an extension direction of the relief hole is the same as an extension direction of the casting pipe.

In some embodiments, the casting pipe further includes a bolt used during the casting and molding of the wall, the bolt correspondingly passes through a pipe body of the casting pipe, the socket straight-through part and the relief hole, and the bolt is configured to assemble the pipe body, the socket straight-through part, and the plug into an integrated structure.

In some embodiments, a middle part of the socket straight-through part has a second annular protrusion facing inward, the pipe body of the casting pipe and the extension pipe are respectively disposed on two sides of the second annular protrusion, and the pipe body and the extension pipe are correspondingly in abutment and fitting engagement with the second annular protrusion.

In some embodiments, an adhesive layer is correspondingly provided on an inner wall of the socket straight-through part, between the extension pipe and the heat shrinkable pipe, and between the inner pipe and the heat shrinkable pipe.

In some embodiments, the adhesive layer on the inner wall of the socket straight-through part is solvent glue, and each of the adhesive layer between the extension pipe and the heat shrinkable pipe, and the adhesive layer between the inner pipe and the heat shrinkable pipe, is epoxy resin adhesive.

In some embodiments, a thickness of the heat shrinkable pipe is between 1.5 mm and 3 mm.

Compared to the prior art, the present disclosure offers at least the following advantageous effects.

The present disclosure achieves waterproofing between the casting pipe and the inner pipe through the connection of the extension pipe and the heat shrinkable pipe, and waterproofing between the casting pipe and the wall is achieved by forming the circumferential groove at the peripheral edge of the casting pipe's end and filling the groove with an epoxy resin adhesive, so that the present disclosure simplifies the waterproof structure and construction method significantly, reduces costs, and improves construction speed. In comparison to commonly used sealants in the construction industry, such as silicone sealant, polysulfide sealant, polyurethane sealant, butyl sealant, and acrylic sealant, the epoxy resin adhesive features higher bonding strength, longer service life, and adaptability to humid environments, thereby enhancing waterproofing reliability.

The waterproof structure provided by the present disclosure is applicable to both a single pipe and a pipe cluster.

REFERENCE NUMERALS

1, Inner pipe; 2, Circumferential groove; 3, Sleeve; 31, Pipe body; 32, Socket straight-through part; 33, Plug; 34, Bolt; 321, Second annular protrusion; 331, First annular protrusion; 332, Relief hole; 4, Wall; 5, Extension pipe; 6, Heat shrinkable pipe; 7, Adhesive layer; 8, Epoxy resin adhesive; 9, Template.

DETAILED DESCRIPTION OF THE EXEMPLARY EMBODIMENTS

Below, the technical solutions of the embodiments of the present disclosure are described clearly and completely with reference to the accompanying drawings. It is evident that the described embodiments represent only a portion of the embodiments of the present disclosure and not all possible embodiments. Based on the described embodiments, all other embodiments that can be derived by those skilled in the art without requiring inventive effort fall within the scope of the present disclosure.

It should be noted that if directional indications such as "up," "down," "left," "right," "front," "back," "top," "bottom," "inner," "outer," "vertical," "horizontal," "longitudinal," "counterclockwise," "clockwise," "circumferential," "radial," "axial," etc., are mentioned in the embodiments of the present disclosure, these directional indications are merely configured to explain the relative positional relationships, movement states, etc., of the components under a particular posture (e.g., as shown in the figures). If the specific posture changes, the directional indications should also change accordingly.

Additionally, if terms like "first" or "second" are mentioned in the embodiments, they are only used for descriptive purposes and should not be understood as indicating relative importance or the quantity of the technical features implied. Features labeled as "first" or "second" may explicitly or implicitly include at least one of the features. Furthermore, the technical solutions described in different embodiments may be combined as long as such combinations do not create contradictions or make the technical solutions unfeasible.

Figure 1:
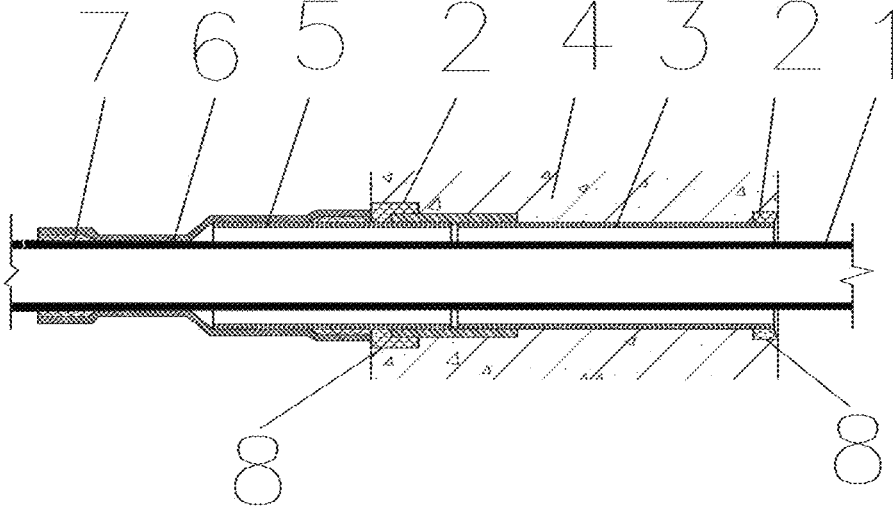
FIG. 1 is a schematic diagram of some embodiments of a waterproofing structure for a wall pipe in an underground construction.

Referring to FIG. 1, in some embodiments, a waterproofing structure for a wall pipe in an underground construction includes an extension pipe 5 connected to a casting pipe 3 of the wall pipe and extending out of a wall 4. A heat shrinkable pipe 6 is sleeved on an outer side of the extension pipe 5 and extends to an outer side of the inner pipe 1. The heat shrinkable pipe 6 is correspondingly and sealedly bonded to the extension pipe 5 and the inner pipe 1. An epoxy resin adhesive 8 is also used, and a circumferential groove 2 is provided at the wall 4 corresponding to a peripheral edge of the casting pipe 3. The epoxy resin adhesive 8 is filled into the circumferential groove 2 and is correspondingly and sealingly bonded to the wall 4 and the casting pipe 3.

In the above embodiment, waterproofing between the casting pipe 3 and the inner pipe 1 is achieved by connecting the extension pipe 5 and the heat shrinkable pipe 6 to the casting pipe 3. Additionally, waterproofing between the casting pipe 3 and the wall 4 is achieved by providing the circumferential groove 2 between the peripheral edge of the end of the casting pipe 3 and the wall 4 and filling the circumferential groove 2 with the epoxy resin adhesive 8, so as to simplify the waterproof structure and construction method, reduces costs and improve the construction speed.

The casting pipe 3 has a first end for connecting the extension pipe 5, and the left end of the casting pipe 3 shown in FIG. 1 serves as the first end.

Optionally, an end face of the first end is embedded in the wall 4, and the epoxy resin adhesive 8 is further sealedly bonded to the extension pipe 5. In this configuration, the epoxy resin adhesive 8 not only provides waterproofing between the casting pipe 3 and the wall 4 but also enhances waterproofing between the extension pipe 5 and the wall 4 and offers auxiliary fixation for the extension pipe 5.

Figure 2:
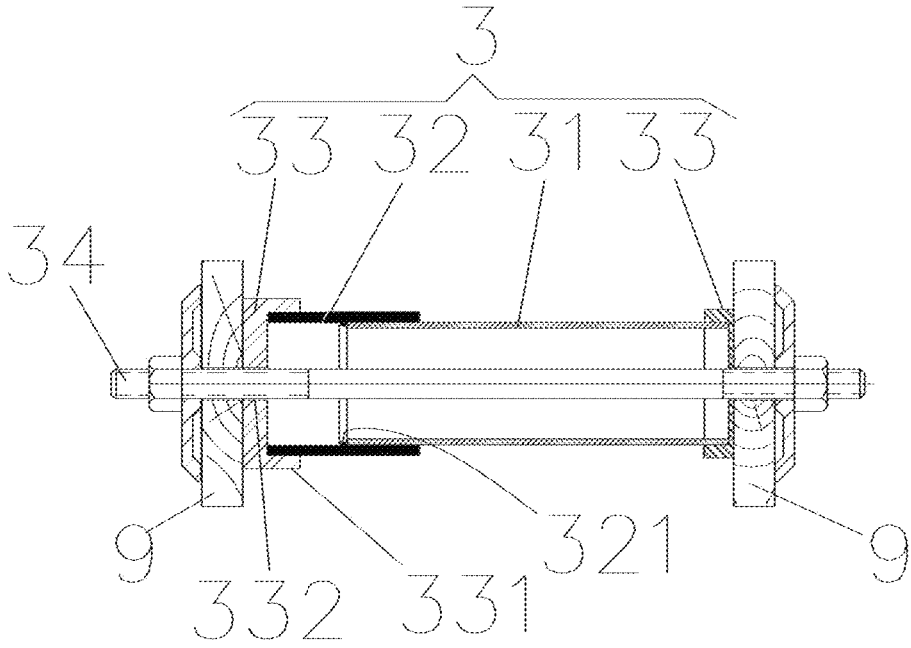
FIG. 2 is a schematic diagram of a casting pipe structure.

Referring to FIGS. 1 and 2, optionally, the casting pipe 3 has a socket straight-through part 32, and the extension pipe 5 is connected to the socket straight-through part 32.

Specifically, a pipe body 31 of the casting pipe 3 is inserted into one end of the socket straight-through part 32, while the extension pipe 5 is inserted into the other end of the socket straight-through part 32. The socket straight-through part 32 connects the extension pipe 5 and the pipe body 31 of the casting pipe 3 into an integrated structure.

By using the socket straight-through part 32 to connect the extension pipe 5 and the pipe body 31 of the casting pipe 3, the extension pipe 5 and the pipe body 31 of the casting pipe 3 can adopt pipes of the same specifications. Gaps between the inner pipe 1 and the casting pipe 3, as well as between the inner pipe 1 and the extension pipe 5, are made equal.

Referring to FIGS. 1 and 2, optionally, a middle part of the socket straight-through part 32 has a second annular protrusion 321 facing inward. The pipe body 31 of the casting pipe 3 and the extension pipe 5 are arranged on two sides of the second annular protrusion 321. The pipe body 31 and the extension pipe 5 are correspondingly in abutment and fitting engagement with the second annular protrusion 321.

Specifically, a height of the second annular protrusion 321 is approximately equal to a wall thickness of the extension pipe 5. An end of the extension pipe 5 is abutted against the left end of the second annular protrusion 321, while an end of the pipe body 31 of the casting pipe 3 is abutted against the right end of the second annular protrusion 321.

The second annular protrusion 321 defines a connection length between the extension pipe 5 and the socket straight-through part 32, as well as a connection length between the pipe body 31 of the casting pipe 3 and the socket straight-through part 32, which prevents the extension pipe 5 or the pipe body 31 of the casting pipe 3 from being inserted into the socket straight-through part 32 at an insufficient length, thereby ensuring a reliable connection between the extension pipe 5 and the casting pipe 3.

An inner wall of the socket straight-through part 32 is provided with an adhesive layer, which serves both bonding and waterproofing functions. Specifically, the adhesive layer uses a solvent-based adhesive. The solvent-based adhesive is characterized by fast curing speed, high bonding strength, and long service life. In the present embodiment, the application of the solvent-based adhesive on the inner wall of the socket straight-through part 32 enhances the connection reliability between the extension pipe 5 and the casting pipe 3.

A thickness of the heat shrinkable pipe 6 is preferably 1.5 mm to 3 mm, such as 1.5 mm, 2 mm, 2.5 mm, and 3 mm.

An adhesive layer 7 is correspondingly provided between the extension pipe 5 and the heat shrinkable pipe 6, as well as between the inner pipe 1 and the heat shrinkable pipe 6. Specifically, the adhesive layer 7 uses epoxy resin adhesive. Compared to hot melt adhesive, the epoxy resin adhesive offers higher bonding strength and longer lifespan. In the present embodiment, the use of epoxy resin adhesive between the extension pipe 5 and the heat shrinkable pipe 6, as well as between the inner pipe 1 and the heat shrinkable pipe 6, enhances the sealing connection reliability and extends the service life of the heat shrinkable pipe 6 with the extension pipe 5 and the inner pipe 1.

Referring to FIGS. 1 and 2, the casting pipe 3 further includes a plug 33. The plug 33 has a first annular protrusion 331 extending to an outer periphery of the casting pipe 3. The plug 33 is used during the casting and molding of the wall 4, and the first annular protrusion 331 is configured to reserve the circumferential groove 2 during the casting and molding of the wall 4.

Optionally, the first annular protrusion 331 is tapered to facilitate removal of the plug 33 after the wall 4 is cast.

Optionally, the plug 33 is provided with a relief hole 332, and an extension direction of the relief hole 332 is the same as an extension direction of the casting pipe 3.

Referring to FIGS. 1 and 2, the casting pipe 3 further includes a bolt 34 used during the casting and molding of the wall 4. The bolt 34 correspondingly passes through the pipe body 31 of the casting pipe 3, the socket straight-through part 32, and the relief hole 332. The bolt 34 is configured to assemble the pipe body 31, the socket straight-through part 32, and the plug 33 into an integrated structure.

Specifically, the socket straight-through part 32 is connected to the pipe body 31 of the casting pipe 3. The plug 33 is inserted into both ends of the casting pipe 3, and the casting pipe 3 is placed between templates 9. The bolt 34 passes through the templates 9 and the casting pipe 3, and a nut is tightened onto the bolt 34 to secure the casting pipe 3 between the templates 9.

The specific construction method is as follows.

Step 1: as shown in FIG. 2, the casting pipe 3 is installed between the templates 9.

Figure 3:
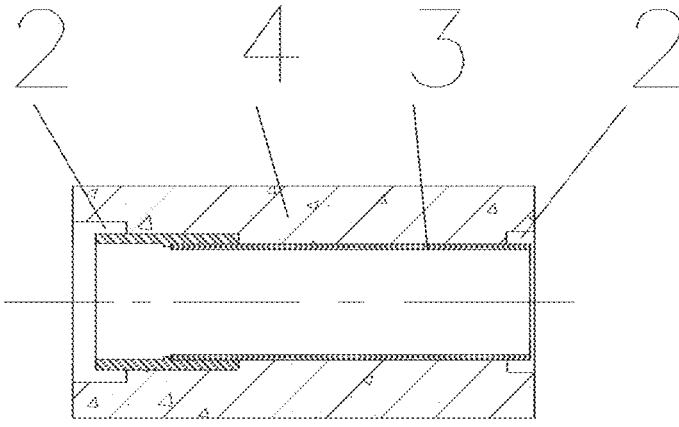
FIG. 3 is a schematic diagram illustrating a state after wall pouring is completed and templates and plugs are removed.

Step 2: the wall 4 is casted. After casting is completed, the templates 9 and the plugs 33 at both ends of the casting pipe 3 are removed. A state after removal is shown in FIG. 3, where the circumferential groove 2 is formed at the wall 4 corresponding to the peripheral edge of the casting pipe 3.

Figure 4:
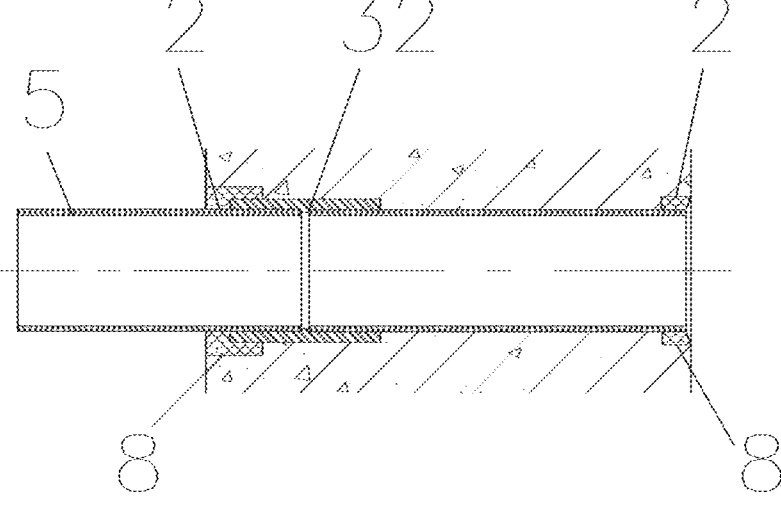
FIG. 4 is a schematic diagram illustrating a state after connecting a extension pipe and injecting epoxy resin adhesive into a circumferential groove.

Step 3: the extension pipe 5 is bonded to the socket straight-through part 32 by using the solvent-based adhesive, and the circumferential groove 2 between the casting pipe 3 and the wall 4 is filled with the epoxy resin adhesive 8, as shown in FIG. 4. At this point, the seal between the outer side of the casting pipe 3 and the wall 4 is completed.

Figure 5:
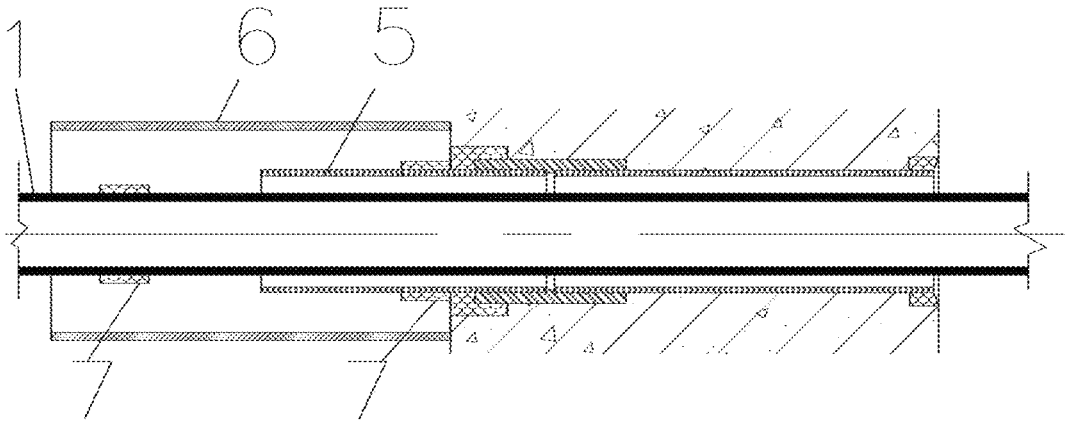
FIG. 5 is a schematic diagram illustrating a state after installing an inner pipe and a heat shrinkable pipe.

Step 4: as shown in FIG. 5, the inner pipe 1 correspondingly passes through the casting pipe 3 and the extension pipe 5. A layer of the adhesive layer 7 is applied at a bonding area between a root of the extension pipe 5 and the outer side of the inner pipe 1, in which the adhesive layer 7 uses epoxy resin adhesive and the heat shrinkable pipe 6 having a 2 mm thickness is sleeved thereon.

Figure 6:
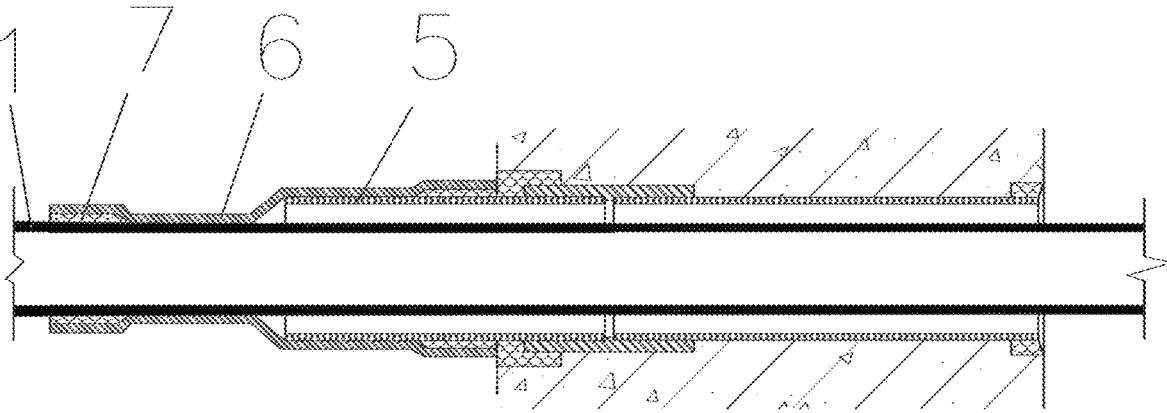
FIG. 6 is a schematic diagram illustrating a state after the heat shrinkable pipe is bonded to the extension pipe and the inner pipe.

Step 5: a hot air gun is used to heat the heat shrinkable pipe 6 to cause the heat shrinkable pipe 6 to shrink tightly and bond to the outer side of the extension pipe 5 and the outer side of the inner pipe 1, as shown in FIG. 6.

At this point, the sealing of the inner pipe 1 to the casting pipe 3 and the casting pipe 3 to the wall 4 is complete.

This waterproof structure does not require welding a water-stopping ring to the outer side of the casting pipe 3, rubber rings, or a short pipe with a flange to fix the rubber ring. The structure is simple and occupies less area of the wall 4, making it applicable to a pipe cluster.

Figure 7:
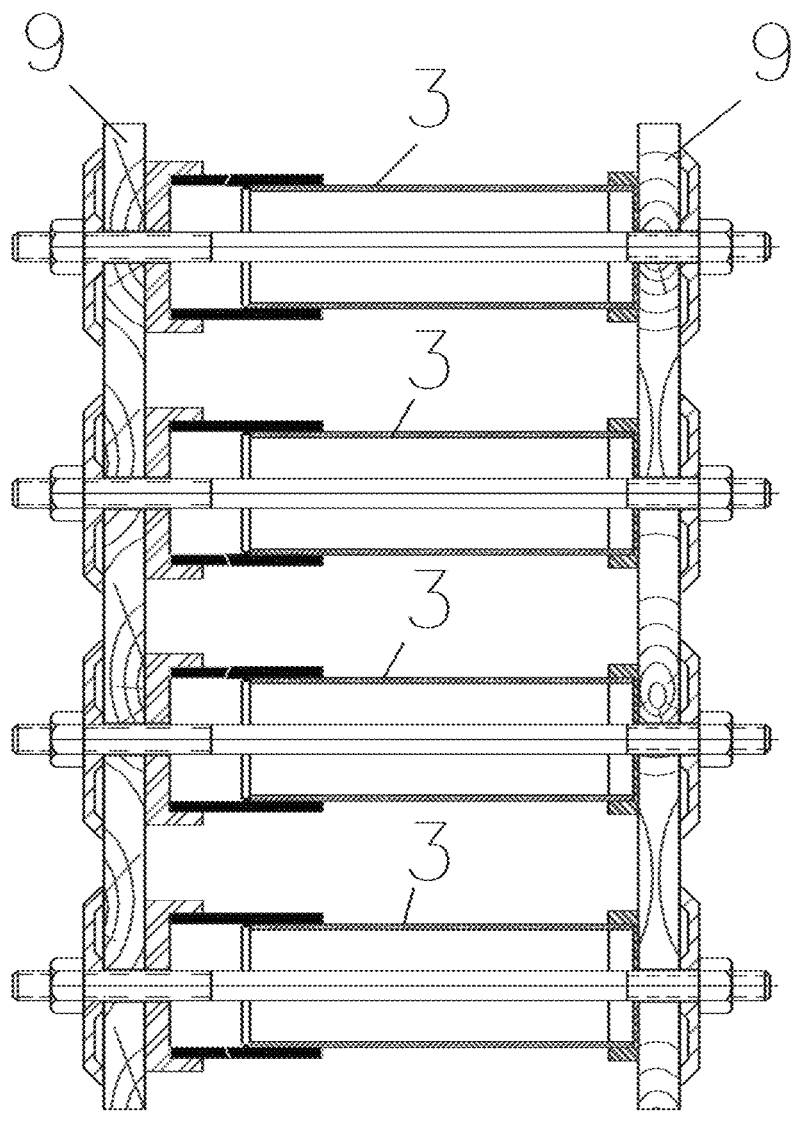
FIG. 7 is a schematic diagram illustrating a state of the casting pipes between templates when being applied to a pipe cluster.
Figure 8:
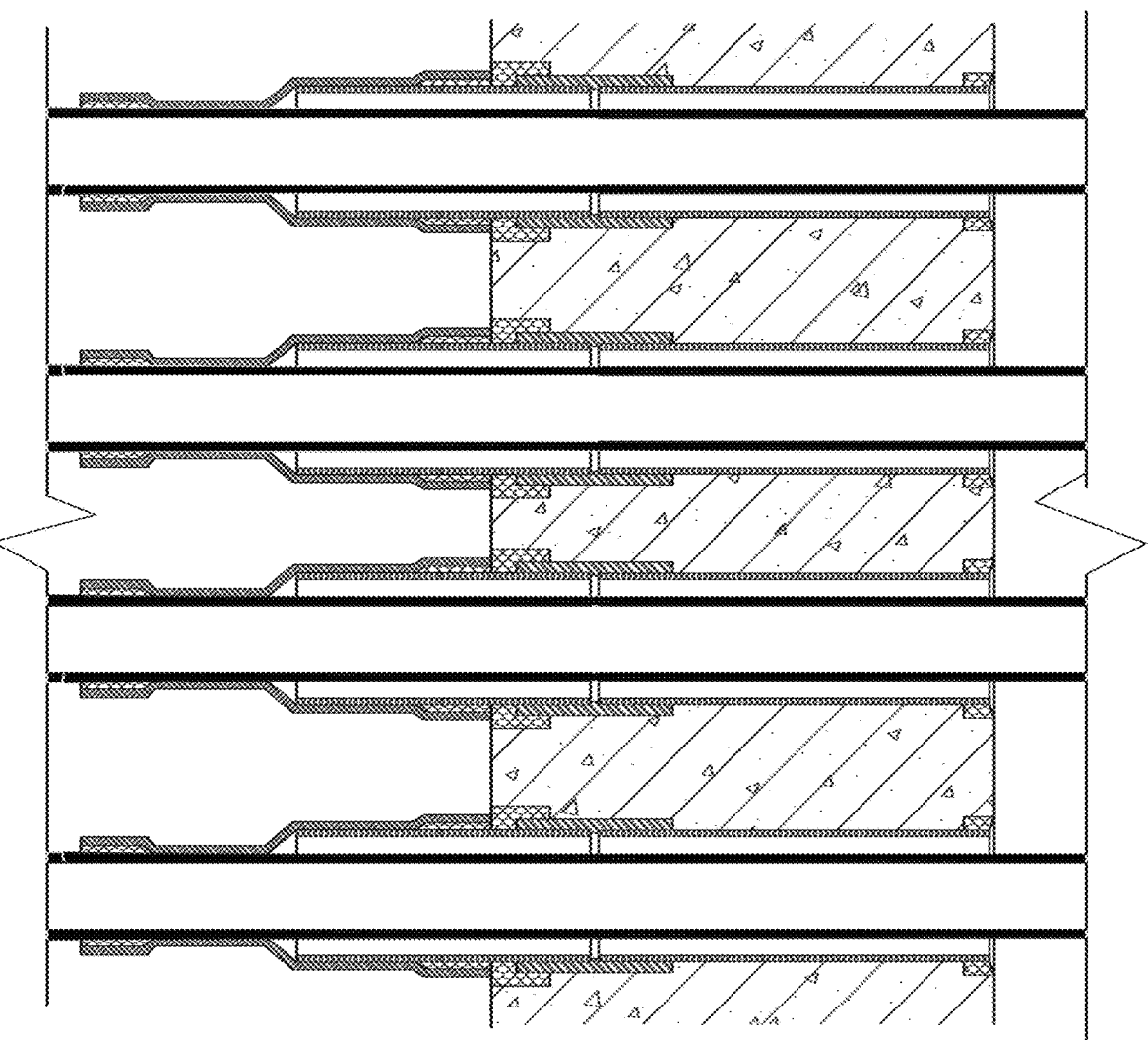
FIG. 8 is a schematic diagram illustrating a final state of the pipe cluster.

As shown in FIG. 7, when applied to the pipe cluster, the casting pipe 3 is installed between the templates 9 according to a layout of the pipe cluster, and then steps 2 through 5 as described above are performed. The final state of the pipe cluster is shown in FIG. 8.

The above detailed description of the embodiments of the present disclosure is provided to help those skilled in the art understand the content of the present disclosure. It should not be construed as limiting the scope of protection of the present disclosure. Any modifications, equivalent transformations, or refinements made by those skilled in the art based on the concept of the present disclosure should fall within the scope of protection of the present disclosure.

What is claimed is:

1. A waterproofing structure for a wall pipe in an underground construction, comprising:
   an extension pipe (5) connected to a casting pipe (3) of the wall pipe and extending out of a wall (4);
   a heat shrinkable pipe (6) sleeved on an outer side of the extension pipe (5) and extending to an outer side of an inner pipe (1) of the wall pipe, wherein the heat shrinkable pipe (6) is correspondingly and sealedly bonded to the extension pipe (5) and the inner pipe (1);
   an epoxy resin adhesive (8); and
   a circumferential groove (2) provided at the wall (4) corresponding to a peripheral edge of the casting pipe (3), wherein the epoxy resin adhesive (8) is filled into the circumferential groove (2), and the epoxy resin adhesive (8) is correspondingly and sealedly bonded to the wall (4) and the casting pipe (3).

2. The waterproofing structure for the wall pipe in the underground construction according to claim 1, wherein the casting pipe (3) has a first end for being connected to the extension pipe (5), an end surface of the first end is embedded in the wall (4), and the epoxy resin adhesive (8) is further sealedly bonded to the extension pipe (5).

3. The waterproofing structure for the wall pipe in the underground construction according to claim 1, wherein the casting pipe (3) has a socket straight-through part (32), and the extension pipe (5) is connected to the socket straight-through part (32).

4. The waterproofing structure for the wall pipe in the underground construction according to claim 3, wherein the casting pipe (3) further includes a plug (33) used during casting and molding of the wall (4), the plug (33) has a first annular protrusion (331) extending to an outer periphery of the casting pipe (3), and the first annular protrusion (331) is configured to reserve the circumferential groove (2) during the casting and molding of the wall (4).

5. The waterproofing structure for the wall pipe in the underground construction according to claim 4, wherein the plug (33) is provided with a relief hole (332), and an extension direction of the relief hole (332) is the same as an extension direction of the casting pipe (3).

6. The waterproofing structure for the wall pipe in the underground construction according to claim 5, wherein the casting pipe (3) further includes a bolt (34) used during casting and molding of the wall (4), the bolt (34) correspondingly passes through a pipe body (31) of the casting pipe (3), the socket straight-through part (32) and the relief hole (332), and the bolt (34) is configured to assemble the pipe body (31), the socket straight-through part (32), and the plug (33) into an integrated structure.

7. The waterproofing structure for the wall pipe in the underground construction according to claim 3, wherein a middle part of the socket straight-through part (32) has a second annular protrusion (321) facing inward, a pipe body (31) of the casting pipe (3) and the extension pipe (5) are respectively disposed on two sides of the second annular protrusion (321), and the pipe body (31) and the extension pipe (5) are correspondingly in abutment and fitting engagement with the second annular protrusion (321).

8. The waterproofing structure for the wall pipe in the underground construction according to claim 3, wherein an adhesive layer (7) is correspondingly provided on an inner wall of the socket straight-through part (32), between the extension pipe (5) and the heat shrinkable pipe (6), and between the inner pipe (1) and the heat shrinkable pipe (6).

9. The waterproofing structure for the wall pipe in the underground construction according to claim 8, wherein the adhesive layer (7) on the inner wall of the socket straight-through part (32) is solvent glue, and each of the adhesive layer (7) between the extension pipe (5) and the heat shrinkable pipe (6), and the adhesive layer (7) between the inner pipe (1) and the heat shrinkable pipe (6), is epoxy resin adhesive.

10. The waterproofing structure for the wall pipe in the underground construction according to claim 1, wherein a thickness of the heat shrinkable pipe (6) is between 1.5 mm and 3 mm.

* * * * *